United States Patent

Meguriya et al.

[11] Patent Number: 6,106,954
[45] Date of Patent: Aug. 22, 2000

[54] SILICONE RUBBER COMPOSITIONS FOR HIGH-VOLTAGE ELECTRICAL INSULATORS AND POLYMERIC BUSHINGS

[75] Inventors: Noriyuki Meguriya; Syuuichi Azechi; Susumu Sekiguchi; Takeo Yoshida, all of Gunma-ken, Japan

[73] Assignee: Shin-Etsu Chemical Co., Ltd., Tokyo, Japan

[21] Appl. No.: 09/222,932

[22] Filed: Dec. 30, 1998

[30] Foreign Application Priority Data

Jan. 7, 1998 [JP] Japan .................................. 10-013464

[51] Int. Cl.[7] .............................. B29D 22/00; C08K 3/22
[52] U.S. Cl. ........................ 428/447; 428/36.8; 523/212; 524/437; 524/786; 174/137 A; 174/137 B
[58] Field of Search .............................. 523/212; 524/437, 524/786; 174/137 A, 137 B; 428/447, 36.8

[56] References Cited

U.S. PATENT DOCUMENTS

| | | | |
|---|---|---|---|
| 3,511,698 | 5/1970 | Talcott | 117/138.8 |
| 3,965,065 | 6/1976 | Elliott | 260/37 SB |
| 4,476,155 | 10/1984 | Niemi | 427/58 |
| 5,519,080 | 5/1996 | Matsushita et al. | 524/437 |
| 5,543,173 | 8/1996 | Horn, Jr. et al. | 427/212 |
| 5,691,407 | 11/1997 | Azechi et al. | 524/437 |
| 5,824,729 | 10/1998 | Matsushita et al. | 524/437 |

FOREIGN PATENT DOCUMENTS

| | | |
|---|---|---|
| 0808868A1 | 11/1997 | European Pat. Off. . |
| 8259820A | 10/1996 | Japan . |
| 208828A | 8/1997 | Japan . |
| 9316337 | 12/1997 | Japan . |

*Primary Examiner*—Margaret G. Moore
*Attorney, Agent, or Firm*—Birch, Stewart, Kolasch & Birch, LLP

[57] ABSTRACT

A silicone rubber composition is obtained by blending (A) 100 parts by weight of an organopolysiloxane composition of the addition reaction curing type with (B) about 30–400 parts by weight of aluminum hydroxide which has been surface treated with an organosilane or organosilazane substantially free of an aliphatic unsaturated group or a partial hydrolyzate thereof so that the aluminum hydroxide has 0.01–2% by weight of carbon affixed thereto. The composition maintains silicone rubber properties even though it is loaded with large amounts of aluminum hydroxide. It cures into a silicone rubber having improved high-voltage electrical insulating properties and thus suited for use as high-voltage electrical insulators.

6 Claims, No Drawings

SILICONE RUBBER COMPOSITIONS FOR HIGH-VOLTAGE ELECTRICAL INSULATORS AND POLYMERIC BUSHINGS

BACKGROUND OF THE INVENTION

1. Field of the Invention

This invention relates to a silicone rubber composition which on heat curing provides silicone rubber serving as high-voltage electrical insulators. It also relates to polymeric bushings.

2. Prior Art

In general, high-voltage electrical insulating materials for use as insulators and bushings for power transmission lines are of porcelain (ceramics) or glass. Since these insulators are heavy and liable to breakage due to a lack of impact resistance, they require careful handling and impose a burden to workers. In a pollutive environment as in seaside areas and industrial areas, there is a tendency that dust, salts and mist attach to the surface of high-voltage electrical insulators, causing leakage currents and dry band discharge leading to flashover failure.

In order to eliminate the drawbacks of porcelain and glass insulators, a number of proposals have been made. For example, U.S. Pat. No. 3,511,698 discloses a weathering resistant high-voltage electrical insulator comprising a member of a thermosetting resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high insulating properties even in the presence of moisture, air pollution, ultraviolet radiation and other outdoor stresses.

JP-A 35982/1978 corresponding to U.S. Pat. No. 3,965,065 discloses that a silicone rubber composition with improved electrical insulation is obtained by heating a mixture of an organopolysiloxane capable of heat curing into silicone rubber and aluminum hydroxide at temperatures above 100° C. for more than 30 minutes. JP-A 57574/1995 corresponding to U.S. Pat. No. 5,519,080 describes that the blending of a methylalkylsiloxane fluid in silicone rubber is effective for providing contact angle recovery with time and preventing flashover failure.

However, the silicone rubber materials used in the prior art techniques mentioned above are not yet fully satisfactory in high-voltage electrical insulation. They must be loaded with large amounts of aluminum hydroxide in order to improve the electrical insulation. However, since aluminum hydroxide itself is hygroscopic, silicone rubber materials loaded therewith lose electrical properties in a humid environment.

SUMMARY OF THE INVENTION

Therefore, an object of the present invention is to provide a novel and improved silicone rubber composition for use as high-voltage electrical insulators which cures into a silicone rubber having good electrical properties despite high loading of aluminum hydroxide.

Another object of the present invention is to provide such a silicone rubber composition which is loaded with aluminum hydroxide having no deleterious effect on an addition reaction curing system.

A further object of the present invention is to provide a novel and improved polymeric bushing having the silicone rubber composition applied and cured to a plastic core.

The invention pertains to a silicone rubber composition for use as a high-voltage electrical insulator comprising an organopolysiloxane composition of the addition reaction curing type and aluminum hydroxide. We have found that aluminum hydroxide which has been surface treated with an organosilane or organosilazane substantially free of an aliphatic unsaturated group or a partial hydrolyzate thereof so that the aluminum hydroxide has 0.01 to 2% by weight of carbon affixed thereto does not adversely affect the addition reaction curing of silicone rubber compositions. Silicone rubber compositions heavily loaded therewith cure into silicone rubber maintaining electrical properties and having good high-voltage electrical insulation.

In a first aspect of the invention, there is provided a silicone rubber composition for use as a high-voltage electrical insulator comprising (A) 100 parts by weight of an organopolysiloxane composition of the organic peroxide or addition reaction curing type, and (B) about 30 to about 400 parts by weight of aluminum hydroxide which has been surface treated with an organosilane or organosilazane substantially free of an aliphatic unsaturated group or a partial hydrolyzate thereof so that the aluminum hydroxide has 0.01 to 2% by weight of carbon affixed thereto.

In a second aspect, there is provided a high-voltage electrical insulator or polymeric bushing in the form of a solid bushing or tubular bushing which has been prepared by applying the silicone rubber composition to an outer periphery of a plastic core, followed by curing.

DETAILED DESCRIPTION OF THE INVENTION

In the silicone rubber composition according to the invention, a first component or component (A) is an organopolysiloxane composition of the addition reaction curing type.

The organopolysiloxane composition (A) of the addition reaction curing type is preferably one comprising as main components, (a) an organopolysiloxane having on the average at least two alkenyl groups in a molecule, (b) an organohydrogenpolysiloxane having at least two hydrogen atoms each attached to a silicon atom in a molecule which is liquid at room temperature, and (c) an addition reaction catalyst. This organopolysiloxane composition of the addition reaction curing type is liquid or paste at room temperature, and cures into a rubbery elastomer when allowed to stand at room temperature or heated.

The organopolysiloxane used as component (a) has on the average at least two alkenyl groups in a molecule and is of the following average compositional formula (1):

$$R^1_a SiO_{(4-a)/2} \quad (1)$$

wherein $R^1$ is a substituted or unsubstituted monovalent hydrocarbon group, 0.01 to 10 mol % of the $R^1$ groups being alkenyl, at least 90 mol % of the $R^1$ groups being methyl, and letter a is a positive number of 1.9 to 2.4.

In formula (1), $R^1$ is a substituted or unsubstituted monovalent hydrocarbon group attached to a silicon atom, preferably having 1 to 12 carbon atoms, more preferably 1 to 8 carbon atoms. Examples include alkyl groups such as methyl, ethyl, propyl, isopropyl, butyl, isobutyl, tert-butyl, pentyl, neopentyl, hexyl, heptyl, octyl, nonyl, decyl and dodecyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl, xylyl, biphenyl and naphthyl; aralkyl groups such as benzyl, phenylethyl, phenylpropyl and methylbenzyl; and substituted ones of these hydrocarbon groups wherein some or all of the hydrogen atoms are replaced by halogen atoms (e.g., F, Cl and Br) or cyano groups, such as chloromethyl, 2-bromoethyl, 3,3,3-trifluoropropyl, 3-chloropropyl and cyanoethyl.

In formula (1), at least 90 mol % of the organic groups represented by $R^1$ are methyl. There are contained on the average at least two alkenyl groups in the molecule. Of the $R^1$ groups, 0.01 to 10 mol %, preferably 0.02 to 5 mol % are alkenyl. A too small content of alkenyl would adversely affect the curing of the composition whereas a too much content of alkenyl would detract from the physical properties of cured products including tensile strength, tear strength and elongation. The alkenyl groups may be attached to a silicon atom at an end of the molecular chain and/or a silicon atom intermediate of the molecular chain.

In formula (1), letter a is a positive number in the range of 1.9 to 2.4, especially 1.95 to 2.05.

Basically, the organopolysiloxane of formula (1) preferably has a linear molecular structure consisting of recurring diorganosiloxane units and has an alkenyl group at either end of the molecular chain. It may have in part a branched structure. Also preferably, the organopolysiloxane is blocked at an end of its molecular chain with a triorganosilyl group such as trivinylsilyl, methyldivinylsilyl, dimethylvinylsilyl or trimethylsilyl.

The molecular weight of the organopolysiloxane is selected as appropriate. In order that the organopolysiloxane provide a liquid silicone rubber composition and cure into a rubbery elastomer, the organopolysiloxane should preferably have a viscosity of about 100 to 300,000 centipoise at 25° C., especially about 1,000 to 100,000 centipoise at 25° C.

Component (b) is an organohydrogenpolysiloxane having at least two hydrogen atoms each attached to a silicon atom (i.e., SiH groups) in a molecule which is liquid at room temperature and of formula (2):

$$R^2_b H_c SiO_{(4-b-c)/2} \qquad (2)$$

wherein $R^2$ is a substituted or unsubstituted monovalent hydrocarbon group having 1 to 10 carbon atoms, letter b is a positive number of 0.7 to 2.1, c is a positive number of 0.001 to 1.0, and the sum of b+c is from 0.8 to 3.0.

In formula (2), $R^2$ is a substituted or unsubstituted monovalent hydrocarbon group having 1 to 10 carbon atoms, preferably 1 to 8 carbon atoms, examples of which are the same as previously mentioned for $R^1$. Preferred hydrocarbon groups represented by $R^2$ are those free of an aliphatic unsaturated bond, with alkyl, aryl, aralkyl and substituted alkyl groups such as methyl, ethyl, propyl, phenyl and 3,3,3-trifluoropropyl being especially preferred. Letter b is a positive number of 0.7 to 2.1, preferably 1 to 2, c is a positive number of 0.001 to 1.0, preferably 0.01 to 1, and the sum of b+c is from 0.8 to 3.0, preferably 1 to 2.4. The organohydrogenpolysiloxane may have a linear, cyclic, branched or three-dimensional network molecular structure while a SiH group may be attached either at an end or intermediate of the molecular chain. The organohydrogenpolysiloxane preferably has a viscosity of about 1 to 1,000 centipoise at 25° C., more preferably about 3 to 500 centipoise at 25° C. although the molecular weight is not critical.

Examples of the organohydrogenpolysiloxane (b) include 1,1,3,3-tetramethyldisiloxane, methylhydrogen cyclic polysiloxane, methylhydrogensiloxane-dimethylsiloxane cyclic copolymers, both end trimethylsiloxy-blocked methylhydrogenpolysiloxane, both end trimethylsiloxy-blocked dimethyl-siloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers consisting of $(CH_3)_2HSiO_{1/2}$ units and $SiO_{4/2}$ units, copolymers consisting of $(CH_3)_2HSiO_{1/2}$ units, $(CH_3)_3SiO_{1/2}$ units and $SiO_{4/2}$ units, and copolymers consisting of $(CH_3)_2HSiO_{1/2}$ units, $SiO_{4/2}$ units, and $(C_6H_5)SiO_{3/2}$ units.

Preferably, the organohydrogenpolysiloxane (b) is blended in an amount of about 0.1 to about 200 parts, more preferably about 0.3 to about 50 parts by weight per 100 parts by weight of the organopolysiloxane (a). Alternatively, the organohydrogenpolysiloxane may be blended in such amounts that about 0.5 to about 20, preferably about 1 to about 3 hydrogen atoms each attached to a silicon atom in its molecule (SiH groups) are available per alkenyl group attached to a silicon atom in the organopolysiloxane (a).

Platinum group metals in elemental, compound and complex forms are useful as the addition reaction catalyst (c). Illustrative are platinum base catalysts such as platinum black, platinic chloride, chloroplatinic acid, reaction products of chloroplatinic acid with monohydric alcohols, complexes of chloroplatinic acid with olefins, and platinum bisacetoacetate, palladium base catalysts such as tetrakis (triphenylphosphine)palladium and dichlorobis-(triphenylphosphine)palladium, and rhodium base catalysts such as chlorotris(triphenylphosphine)rhodium and tetrakis (triphenylphosphine)rhodium. The amount of the addition reaction catalyst added is a catalytic amount and is usually from about 0.1 to 1,000 ppm, especially about 1 to 100 ppm of platinum group metal based on components (a) and (b) combined. Less than 0.1 ppm of the catalyst is insufficient to promote the curing of the composition whereas more than 1,000 ppm of the catalyst is uneconomical.

Insofar as the benefits of the invention are not impaired, fillers may be blended with components (a), (b) and (c) in order to adjust the fluidity and/or to improve the mechanical strength of molded parts. Such fillers include reinforcing fillers such as precipitated silica, fumed silica, fired silica and fumed titanium oxide; and non-reinforcing fillers such as ground quartz, diatomaceous earth, asbestos, aluminosilicate, iron oxide, zinc oxide, and calcium carbonate. The fillers may be used as such or after surface treatment with organic silicon compounds such as hexamethyldisilazane, trimethylchlorosilane, and polymethylsiloxane. If desired, pigments, heat resistance modifiers, flame retardants, and plasticizers may be blended although aluminum hydroxide is excluded.

Component (B) is surface-treated aluminum hydroxide which is effective for improving the electrical insulating properties, typically arc resistance and tracking resistance, of silicone rubber, and by virtue of surface treatment, also effective for preventing the silicone rubber from losing the electrical insulating properties under humid conditions. It is essential for the composition of the invention. The aluminum hydroxide used herein is generally represented by the formula:

$Al_2O_3 \cdot 3H_2O$ or $Al(OH)_3$, and preferably in particulate form having a mean particle size of about 0.1 to 20 μm, especially about 0.5 to about 15 μm and a specific surface area of about 1.0 to 10 m$^2$/g as measured by a BET method. The mean particle size can be determined as a weight mean diameter or median diameter by a particle size distribution measuring device based on such a process as laser light diffraction process.

Aluminum hydroxide component (B) is obtained by surface treating aluminum hydroxide with an organic silicon compound in the form of an organosilane or organosilazane substantially free of an aliphatic unsaturated group or hydrolyzate thereof. As a result of surface treatment with the organic silicon compound, the aluminum hydroxide has affixed to its surface a carbonaceous matter or coating originating from the organic silicon compound and substantially free of aliphatic unsaturated groups. The carbonaceous matter or coating is necessary for rendering aluminum hydroxide hydrophobic. The amount of carbon affixed is 0.01 to 2% by weight, preferably 0.02 to 1% by weight. With a carbon affix amount of less than 0.01% by weight, aluminum hydroxide can absorb a more amount of moisture or water and would thus deteriorate its electrical properties upon absorption of moisture or water. A carbon affix amount of more than 2% by weight would hinder surface treatment, which requires a more cost. The carbon affix is preferably derived mainly from alkyl groups and should be substantially free of aliphatic unsaturated groups. As used herein, the term "substantially free of aliphatic unsaturated groups" designates that the amount of aliphatic unsaturated groups (typically alkenyl groups such as vinyl and allyl) is not more than $1.0 \times 10^{-5}$ mol per gram of aluminum hydroxide. A more amount of aliphatic unsaturated groups would retard the rate of addition reaction of the composition with the lapse of time so that the composition may become difficult to mold. With an aliphatic unsaturated group amount of up to $1.0 \times 10^{-5}$ mol/g, preferably up to $5.0 \times 10^{-6}$ mol/g, the influence of aliphatic unsaturated groups is negligible.

The surface treated aluminum hydroxide is typically obtained by mixing or blending untreated aluminum hydroxide with an organosilane or organosilazane or hydrolyzate thereof, for example, an alkylsilane or alkylsilazane coupling agent or partial hydrolyzate thereof. Exemplary coupling agents include alkylsilazanes such as hexamethyldisilazane and octamethyltrisilazane; alkylalkoxysilanes such as methyltrimethoxysilane, ethyltriethoxysilane, dimethyldimethoxysilane, diethyldimethoxysilane, trimethylmethoxysilane, trimethylethoxysilane, ethyltrimethoxysilane and methyltriethoxysilane; and alkylchlorosilanes such as methyltrichlorosilane, ethyltrichlorosilane, dimethyldichlorosilane, diethyldichlorosilane, and trimethylchlorosilane. The alkyl groups may be either firmly attached to aluminum hydroxide through reaction between the coupling agent and aluminum hydroxide or merely physically adsorbed on aluminum hydroxide. The alkyl groups may be either uniformly distributed on surfaces of aluminum hydroxide or introduced in a necessary amount on the average by mixing untreated aluminum hydroxide and treated aluminum hydroxide. Preferred alkyl groups are those of 1 to 12 carbon atoms, especially 1 to 10 carbon atoms, as exemplified above for R$^1$, such as methyl, ethyl, propyl, isopropyl, butyl, isobutyl, tert-butyl, pentyl, and hexyl.

Component (B) or aluminum hydroxide is blended in an amount of about 30 to about 400 parts, preferably about 50 to about 300 parts by weight per 100 parts by weight of the organopolysiloxane composition (A). On this basis, compositions containing less than 30 parts of component (B) cure into products which are less improved in tracking resistance and other electrical properties whereas compositions loaded with more than 400 parts of component (B) are difficult to blend and handle and would cure into hard brittle products.

The composition of the invention may be prepared by kneading components (a) to (c), component (B), and optional components in a conventional manner. Although the curing conditions are not critical, the preferred curing procedure includes primary curing at room temperature (e.g., 5 to 35° C.) to about 280° C. for about 10 seconds to 4 hours and secondary or post curing at about 100 to 250° C. for about ½ to 30 hours.

The silicone rubber composition for use as high-voltage electrical insulators according to the invention does not lose electrical insulating properties even though it is loaded with large amounts of aluminum hydroxide. It cures into a silicone rubber having improved high-voltage electrical insulating properties. In the second aspect, the silicone rubber composition is applied to an outer periphery of a plastic core and cured thereto. The plastic core is made of thermoplastic resins, typically glass fiber-reinforced plastics. There is obtained a high-voltage electrical insulator or polymeric bushing which may take the form of a solid bushing or hollow bushing.

EXAMPLE

Examples of the present invention are given below by way of illustration and not by way of limitation. All parts are by weight. "Initial" physical properties are those of silicone rubber sheets as prepared and prior to immersion in pure water.

Example 1

A kneader/mixer was charged with 80 parts of a dimethylpolysiloxane blocked with a dimethylvinylsiloxy group at each end of its molecular chain having a viscosity of 10,000 cs at 25° C., 40 parts of fumed silica Aerosil 200 (Nippon Aerosil K.K.), 5 parts of hexamethyldisilazane, and 2 parts of water. The contents were agitated for one hour at room temperature (25° C.), the mixer was then heated to an internal temperature of 150° C., and agitation was continued for a further 3 hours, yielding a liquid silicone rubber base (A). To 40 parts of this liquid silicone rubber base (A) were added 60 parts of a dimethylpolysiloxane blocked with a dimethylvinylsiloxy group at each end of its molecular chain having a viscosity of 1,000 cs at 25° C., and 120 parts of aluminum hydroxide (B) having 0.18% by weight of carbon affixed thereto and a mean particle size of 1 μm. The ingredients were mixed for one hour at room temperature. Thereafter, 2 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

Methylhydrogenpolysiloxane (C)

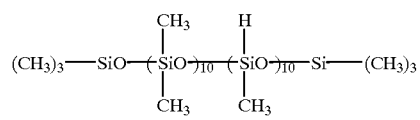

Note that aluminum hydroxide (B) was obtained by adding 2 g of ethyltrimethoxysilane to 100 g of untreated aluminum hydroxide H42M (Showa Denko K.K.), agitating them for one hour at room temperature, heating the mixture to 100° C., and continuing agitation at 100° C. for a further 2 hours for completing reaction. As a consequence, the carbonaceous matter affixed to the surface of aluminum hydroxide (B) was substantially free of aliphatic unsaturated groups.

Using a disk rheometer ASTM 100 model (Toyo Seiki K.K.), the silicone rubber composition was examined for cure at 150° C. Provided that the torque after 2 minutes was 100%, the time passed until the torque reached 50% was measured as T50. The same composition, but free of the crosslinking agent, methylhydrogenpolysiloxane was allowed to stand for 1 week and 1 month whereupon the crosslinking agent was added to the composition, which was similarly examined for cure. The results are shown in Table 1.

The silicone rubber composition was press molded at 150° C. for 10 minutes into rubber sheets of 6 mm, 2 mm and 1 mm thick. The sheet of 2 mm thick was measured for physical properties, hardness (Hs), tensile strength (Ts) and elongation (El) according to JIS K6301, with the results shown in Table 2. The sheet of 2 mm thick was cut to a specimen of 80 mm×80 mm. After measuring its initial weight, the specimen was immersed in pure water at 25° C. for 100 hours whereupon the weight of the specimen was measured again. A percent weight change is reported in Table 2 as a water pickup.

The sheet of 1 mm thick was measured for initial volume resistivity, dielectric constant, dielectric loss, and dielectric breakdown voltage according to JIS K6911. After the sheet was immersed in pure water at 25° C. for 100 hours, the same properties were measured. The results are shown in Table 2.

The sheet of 6 mm thick was subject to a tracking test and an erosion loss test, both described below. The results are shown in Table 3.

Tracking test

The test was according to the standard ASTM D-2303-64T. To a test assembly with an electrode-to-electrode distance of 50 mm under an applied voltage of 4 kV, a foul solution (an aqueous solution containing 0.1% of $NH_4Cl$ and 0.02% of nonionic surfactant) was applied dropwise from the upper electrode at a rate of 0.6 ml/min. A time taken until a track was created to turn conductive was measured.

Erosion weight loss

An erosion weight loss (% by weight) which represents a degree of deterioration of rubber sheet by heat and spark during the tracking test was determined.

Erosion weight loss (wt. %)=(weight loss by erosion)/(weight of sheet before test)×100%

Example 2

To 40 parts of the silicone rubber base (A) obtained in Example 1 were added 60 parts of a dimethylpolysiloxane blocked with a dimethylvinylsiloxy group at each end of its molecular chain having a viscosity of 1,000 cs at 25° C., and 120 parts of aluminum hydroxide (D) having 0.32% by weight of carbon affixed thereto and a mean particle size of 1 μm. The ingredients were mixed for one hour at room temperature. Thereafter, 2.5 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

Note that aluminum hydroxide (D) was obtained by adding 5 g of methyltrimethoxysilane to 100 g of untreated aluminum hydroxide H42M (Showa Denko K.K.), agitating them for one hour at room temperature, heating the mixture to 100° C., and continuing agitation at 100° C. for a further 2 hours for completing reaction. As a consequence, the carbonaceous matter affixed to the surface of aluminum hydroxide (D) was substantially free of aliphatic unsaturated groups.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

Example 3

To 40 parts of the silicone rubber base (A) obtained in Example 1 were added 60 parts of a dimethylpolysiloxane blocked with a dimethylvinylsiloxy group at each end of its molecular chain having a viscosity of 1,000 cs at 25° C., and 120 parts of aluminum hydroxide (E) having 0.09% by weight of carbon affixed thereto and a mean particle size of 8 μm. The ingredients were mixed for one hour at room temperature. Thereafter, 2.5 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

Note that aluminum hydroxide (E) was obtained by adding 1 g of hexamethyldisilazane to 100 g of untreated aluminum hydroxide H42M (Showa Denko K.K.), agitating them for one hour at room temperature, heating the mixture to 120° C., and continuing agitation at 120° C. for a further 2 hours for completing reaction. As a consequence, the carbonaceous matter affixed to the surface of aluminum hydroxide (E) was substantially free of aliphatic unsaturated groups.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

Comparative Example 1

To 40 parts of the liquid silicone rubber base (A) obtained in Example 1 were added 60 parts of a dimethylpolysiloxane blocked with a dimethylvinylsiloxy group at each end of its molecular chain having a viscosity of 1,000 cs at 25° C., 120 parts of untreated aluminum hydroxide E42M (Showa Denko K.K.) having a mean particle size of 1 μm, 2.5 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor. The ingredients were mixed at room temperature until uniform, yielding a silicone rubber composition.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

Comparative Example 2

To 40 parts of the silicone rubber base (A) obtained in Example 1 were added 60 parts of a dimethylpolysiloxane blocked with a dimethylvinylsiloxy group at each end of its molecular chain having a viscosity of 1,000 cs at 25° C., and 120 parts of aluminum hydroxide (F) having a vinyl content of $4.2 \times 10^{-5}$ mol/g, a carbon affix amount of 0.12% by weight and a mean particle size of 1 μm. The ingredients were mixed for one hour at room temperature. Thereafter, 2.8 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

Note that aluminum hydroxide (F) was obtained by adding 1 g of vinyltrimethoxysilane and 0.5 g of methyltrimethoxysilane to 100 g of untreated aluminum hydroxide H42M (Showa Denko K.K.), agitating them for one hour at room temperature, heating the mixture to 100° C., and continuing agitation at 100° C. for a further 2 hours for completing reaction. As a consequence, the carbonaceous matter affixed to the surface of aluminum hydroxide (F) contained the above amount of vinyl.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

Comparative Example 3

To 40 parts of the silicone rubber base (A) obtained in Example 1 were added 60 parts of a dimethylpolysiloxane blocked with a dimethylvinylsiloxy group at each end of its molecular chain having a viscosity of 1,000 cs at 25° C., and 120 parts of aluminum hydroxide (G) having a vinyl content of $8.9 \times 10^{-5}$ mol/g, a carbon affix amount of 0.42% by weight and a mean particle size of 1 μm. The ingredients were mixed for one hour at room temperature. Thereafter, 2 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

Note that aluminum hydroxide (G) was obtained by adding 2 g of divinyltetramethyldisilazane and 2 g of hexamethyldisilazane to 100 g of untreated aluminum hydroxide H32 (Showa Denko K.K.), agitating them for one hour at room temperature, heating the mixture to 100° C., and continuing agitation at 100° C. for a further 2 hours for completing reaction. As a consequence, the carbonaceous matter affixed to the surface of aluminum hydroxide (G) contained the above amount of vinyl.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

Comparative Example 4

To 40 parts of the silicone rubber base (A) obtained in Example 1 were added 60 parts of a dimethylpolysiloxane blocked with a dimethylvinylsiloxy group at each end of its molecular chain having a viscosity of 1,000 cs at 25° C., and 20 parts of aluminum hydroxide (B) used in Example 1. The ingredients were mixed for one hour at room temperature. Thereafter, 2.5 parts of methylhydrogenpolysiloxane (C) as a crosslinking agent, 0.1 part of a 1% isopropyl alcohol solution of chloroplatinic acid, and 0.05 part of ethynyl cyclohexanol as a reaction inhibitor were added. The ingredients were mixed at room temperature until uniform, yielding a silicone rubber composition.

As in Example 1, the silicone rubber composition was examined for initial cure and cure after aging, with the results shown in Table 1. The silicone rubber composition was press molded at 150° C. for 10 minutes into rubber sheets of 6 mm, 2 mm and 1 mm thick. As in Example 1, the sheets were measured for rubber physical properties, water pickup, and electrical properties, with the results shown in Table 2. The sheet of 6 mm thick was subject to the tracking and erosion loss tests, with the results shown in Table 3.

TABLE 1

|  | E1 | E2 | E3 | CE1 | CE2 | CE3 | CE4 |
|---|---|---|---|---|---|---|---|
| Initial T50 (sec.) | 32 | 35 | 30 | 34 | 32 | 30 | 38 |
| T50 after 1 week (sec.) | 33 | 35 | 31 | 34 | 38 | 40 | 38 |
| T50 after 1 month (sec.) | 34 | 36 | 31 | 35 | 45 | 56 | 38 |

TABLE 2

|  |  | E1 | E2 | E3 | CE1 | CE2 | CE3 | CE4 |
|---|---|---|---|---|---|---|---|---|
| Initial | Hs (JIS-A) | 56 | 55 | 52 | 54 | 60 | 58 | 33 |
|  | Ts (kgf/cm$^2$) | 51 | 33 | 24 | 22 | 41 | 36 | 20 |
|  | El (%) | 180 | 210 | 160 | 140 | 200 | 180 | 170 |
| Initial | Volume resistivity (Ω-cm) | $4.5 \times 10^{14}$ | $3.8 \times 10^{14}$ | $7.1 \times 10^{14}$ | $2.6 \times 10^{14}$ | $3.5 \times 10^{14}$ | $5.0 \times 10^{14}$ | $1.2 \times 10^{15}$ |
|  | Breakdown voltage (kV/mm) | 29 | 29 | 28 | 28 | 29 | 27 | 30 |
|  | Dielectric constant @60 Hz | 3.8 | 3.9 | 4.0 | 4.3 | 3.8 | 4.1 | 3.1 |
|  | Dielectric loss (@60 Hz) | 0.032 | 0.041 | 0.051 | 0.056 | 0.043 | 0.048 | 0.014 |
| After immersion | Water pickup (%) | 0.27 | 0.34 | 0.42 | 0.89 | 0.36 | 0.39 | 0.08 |
|  | Volume resistivity Ω-cm | $4.5 \times 10^{13}$ | $8.2 \times 10^{13}$ | $2.3 \times 10^{13}$ | $1.3 \times 10^{8}$ | $4.2 \times 10^{13}$ | $3.6 \times 10^{13}$ | $6.5 \times 10^{14}$ |
|  | Breakdown voltage (kV/mm) | 27 | 27 | 25 | 7 | 26 | 27 | 28 |
|  | Dielectric constant @60 Hz | 4.8 | 4.5 | 5.1 | UM | 4.9 | 5.2 | 3.7 |
|  | Dielectric loss @60 Hz | 0.076 | 0.069 | 0.091 | UM | 0.081 | 0.095 | 0.027 |

UM: unmeasurable

TABLE 3

|  | E1 | E2 | E3 | CE1 | CE2 | CE3 | CE4 |
|---|---|---|---|---|---|---|---|
| Tracking time (hr.) | 12.4 | 14.5 | 11.0 | 10.5 | 12.2 | 11.5 | 2.5 |
| Erosion weight loss (wt %) | 0.03 | 0.02 | 0.03 | 0.04 | 0.03 | 0.03 | 2.84 |

It is evident that the silicone rubber composition according to the invention maintains silicone rubber properties and exhibits improved high-voltage insulating properties even though it is loaded with large amounts of aluminum hydroxide.

Japanese Patent Application No. 013464/1998 is incorporated herein by reference.

Reasonable modifications and variations are possible from the foregoing disclosure without departing from either the spirit or scope of the present invention as defined by the claims.

We claim:

1. A silicone rubber composition for use as a high-voltage electrical insulator, comprising (A) 100 parts by weight of an addition reaction curing organopolysiloxane composition, and (B) about 30 to about 400 parts by weight of aluminum hydroxide which has been surface treated with an organosilane or organosilazane substantially free of an aliphatic unsaturated group or a partial hydrolyzate thereof so that the aluminum hydroxide has 0.01 to 2% by weight of carbon affixed thereto.

2. The silicone rubber composition of claim 1 wherein said organopolysiloxane composition comprises as main components, (a) 100 parts by weight of an organopolysiloxane having on the average at least two alkenyl groups in a molecule of the following average compositional formula (1):

$$R^1_a SiO_{(4-a)/2} \qquad (2)$$

wherein $R^1$ is a substituted or unsubstituted monovalent hydrocarbon group, 0.01 to 10 mol % of the $R^1$ groups being alkenyl, at least 90 mol % of the $R^1$ groups being methyl, and letter a is a positive number of 1.9 to 2.4, (b) about 0.1 to about 200 parts by weight of an organohydrogenpolysiloxane having at least two hydrogen atoms each attached to a silicon atom in a molecule, of the following average compositional formula (2):

$$R^2_b H_c SiO_{(4-b-c)/2} \qquad (2)$$

wherein $R^2$ is a substituted or unsubstituted monovalent hydrocarbon group having 1 to 10 carbon atoms, letter b is a positive number of 0.7 to 2.1, c is a positive number of 0.001 to 1.0, and the sum of b+c is from 0.8 to 3.0, said organohydrogenpolysiloxane being liquid at room temperature, and (c) a catalytic amount of an addition reaction catalyst.

3. The silicone rubber composition of claim 1 wherein in component (B), the organosilane or organosilazane or partial hydrolyzate thereof is a silazane having an alkyl group, alkylalkoxysilane, or partial hydrolyzate thereof.

4. The silicone rubber composition of claim 1 wherein in component (B), aluminum hydroxide has a mean particle size in the range of 0.1 to 20 μm.

5. A polymeric bushing which has been prepared by applying the silicone rubber composition of any one of claims 1 to 4 to an outer periphery of a plastic core, followed by curing.

6. The silicone rubber composition of claim 2, further comprising one or more fillers, pigments, heat resistance modifiers, flame retardants, and plasticizers.

* * * * *